(12) United States Patent
Chiu

(10) Patent No.: US 8,411,193 B2
(45) Date of Patent: Apr. 2, 2013

(54) LENS MODULE HAVING LIQUID CRYSTAL LENS AND IMAGE PICK-UP DEVICE USING SAME

(75) Inventor: Chi-Wei Chiu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 352 days.

(21) Appl. No.: 12/856,649

(22) Filed: Aug. 14, 2010

(65) Prior Publication Data

US 2011/0304762 A1  Dec. 15, 2011

(30) Foreign Application Priority Data

Jun. 10, 2010  (TW) ............................... 99118827 A

(51) Int. Cl.
*G02B 13/16* (2006.01)
*G02B 13/00* (2006.01)
*H04N 5/225* (2006.01)
*G02F 1/03* (2006.01)

(52) U.S. Cl. ......... 348/335; 348/345; 348/373; 359/253
(58) Field of Classification Search .................. 348/335, 348/345, 373, 374–376; 359/245, 253
See application file for complete search history.

(56) References Cited

U.S. PATENT DOCUMENTS

| 7,724,347 | B2* | 5/2010 | Tseng et al. | 348/335 |
| 8,028,473 | B2* | 10/2011 | Galstian et al. | 49/57 |
| 2011/0134303 | A1* | 6/2011 | Jung et al. | 348/340 |
| 2012/0140101 | A1* | 6/2012 | Afshari et al. | 348/373 |
| 2012/0200764 | A1* | 8/2012 | Afshari et al. | 348/345 |

* cited by examiner

*Primary Examiner* — Nhan T Tran
(74) *Attorney, Agent, or Firm* — Altis Law Group, Inc.

(57) ABSTRACT

A lens module includes a liquid crystal lens, a lens barrel and two electrically conductive traces. The liquid crystal lens includes a light incident surface, a light output surface facing away from the light incident surface, and a number of side wall surfaces interconnecting the light incident surface and the light output surface. The liquid crystal lens includes at least two electrode layers. Each of the electrode layers comprising a connection terminal exposed at the corresponding side wall surface. The liquid crystal lens is received in the lens barrel. The two electrically conductive traces are embedded in an outer surface of the lens barrel, and includes a first end electrically connected to the corresponding connection terminal, and a second end for electrical connection to an external circuit.

15 Claims, 7 Drawing Sheets

LENS MODULE HAVING LIQUID CRYSTAL LENS AND IMAGE PICK-UP DEVICE USING SAME

BACKGROUND

1. Technical Field

The present disclosure relates to lens modules, and more particularly to a lens module having a liquid crystal (LC) lens and an image pick-up device using the lens module.

2. Description of Related Art

At present, image pick-up devices such as video cameras are widely used. The image pick-up device includes a lens module. The lens module is configured for focusing light onto an image sensor.

Generally, a lens module includes plastic or glass lenses and a lens barrel holding the lenses. A complicated bulky motor is used to move the lenses during focusing. In recent years, some lens modules use LC lenses instead of the plastic or glass lenses. The LC lens has two electrode layers and a LC layer between the two electrode layers. When different voltages are applied to the two electrode layers, the LC lens has different focal lengths.

The two electrode layers are electrically connected to a printed circuit board or a socket of the image pick-up device with a flexible circuit board. The flexible circuit board may cause the image pick-up device have a larger size.

Therefore, a lens module and an image pick-up device are desired to overcome the above-mentioned shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
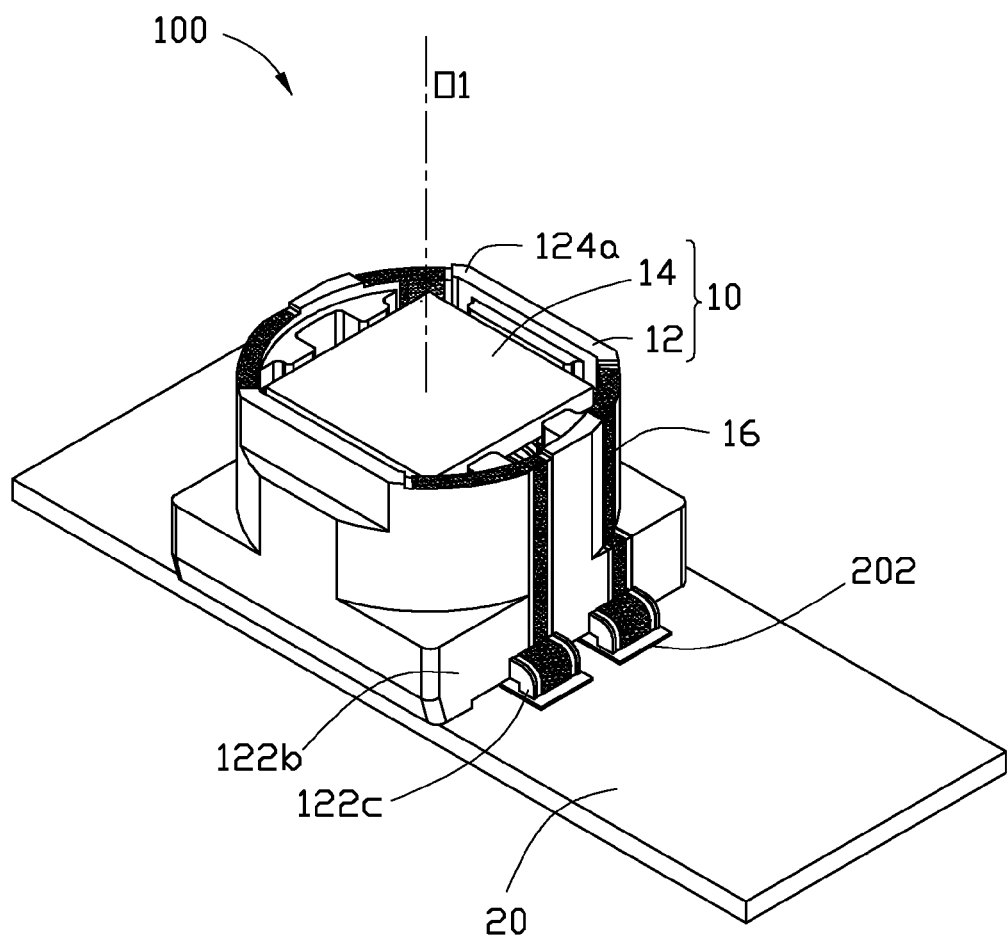
FIG. 1 is a schematic, assembled view of an image pick-up device in accordance with a first exemplary embodiment, including an LC lens group.
Figure 2:
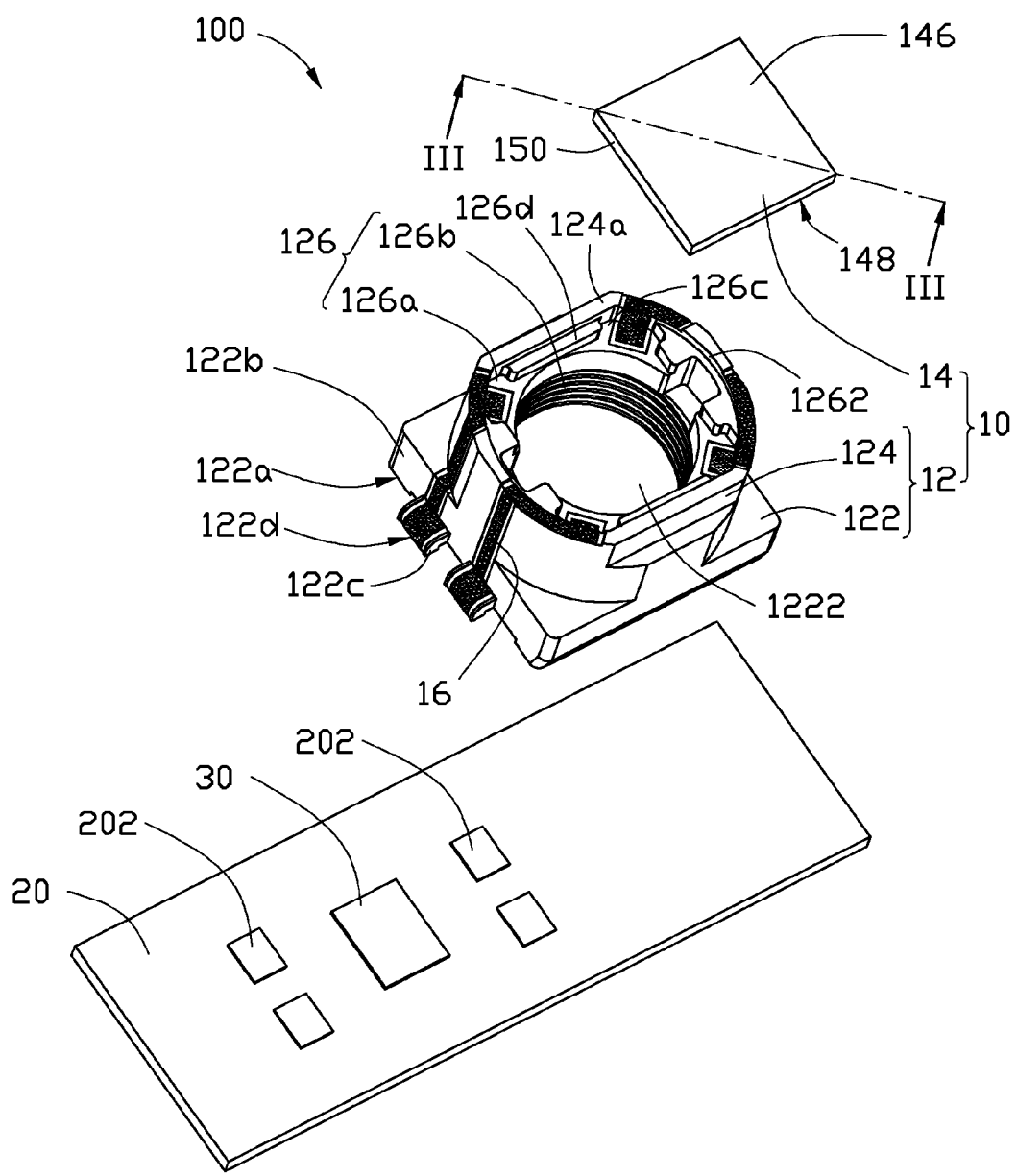
FIG. 2 is a schematic, disassembled view of the image pick-up device in FIG. 1.

Referring to FIGS. 1 and 2, an image pick-up device 100 in accordance with a first exemplary embodiment includes a lens module 10, a printed circuit board 20 and an image sensor 30. The lens module 10 includes a lens barrel 12 and an LC lens group 14.

Figure 3:
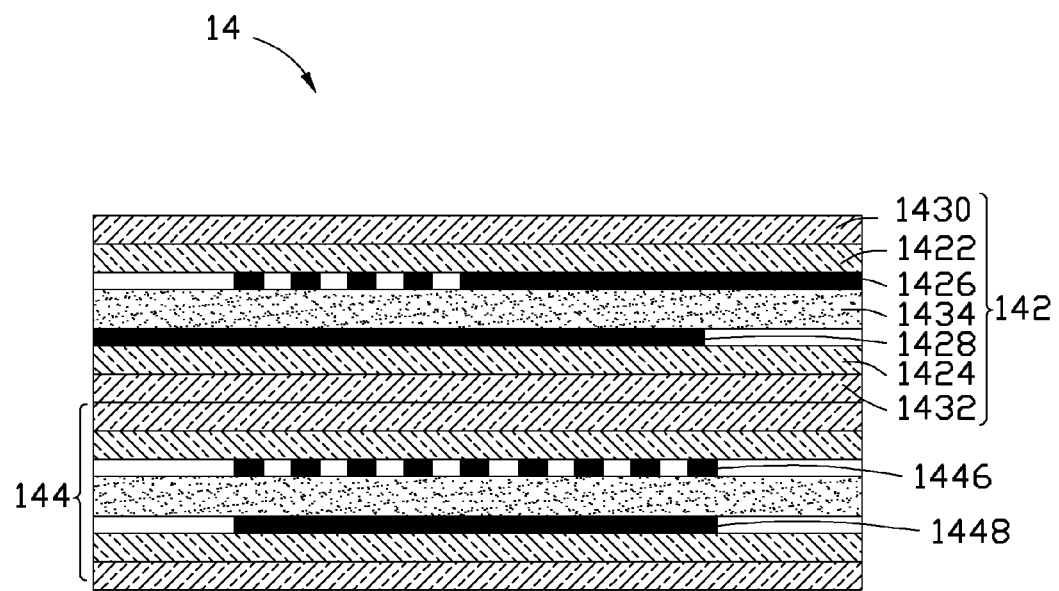
FIG. 3 is a cross-sectional view taken along line of FIG. 2, showing a structure of the LC lens group.

Referring also to FIG. 3, the LC lens group 14 includes two LC lenses 142, 144 sequentially stacked on top of each other. The two LC lenses 142 and 144 are both substantially square, have substantially the same size, and are substantially optically aligned with each other. The LC lens group 14 has a light incident surface 146, a light output surface 148 facing away from the light incident surface 146, and four side wall surfaces 150 interconnecting the light incident surface 146 and the light output surface 148.

The LC lens 142 includes a first light-pervious plate 1422, a second light-pervious plate 1424, a first electrode layer 1426, a second electrode layer 1428, a first polarizer layer 1430, a second polarizer layer 1432, and an LC layer 1434. The first and second light-pervious layers 1422, 1424 are arranged facing toward each other. The first electrode layer 1426 is arranged on a surface of the first light-pervious layer 1422 and adjacent to the second light-pervious layer 1424. The second electrode layer 1428 is arranged on a surface of the second light-pervious layer 1424 and adjacent to the first light-pervious layer 1422. The LC layer 1434 is sandwiched between the first and second electrode layers 1426 and 1428. The first polarizer layer 1430 is arranged on a surface of the first light-pervious layer 1422 away from the second light-pervious layer 1424. The second polarizer layer 1432 is arranged on a surface of the second light-pervious layer 1424 away from the first light-pervious layer 1422.

Figure 4:
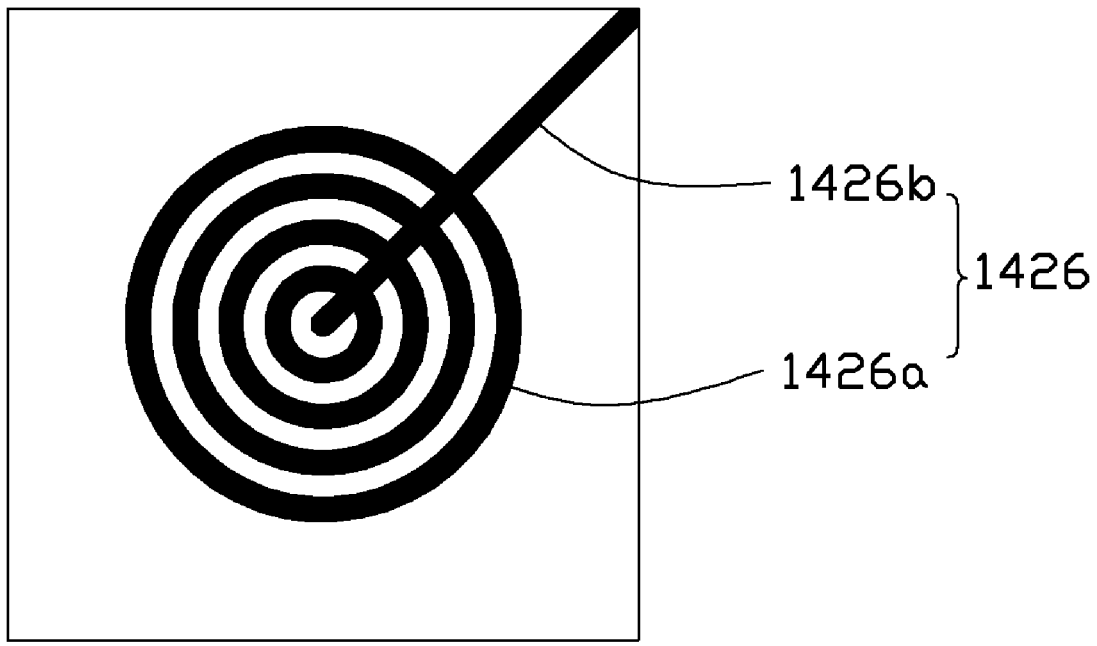
FIG. 4 shows a structure of a first electrode layer of the LC lens group in FIG. 3.
Figure 5:
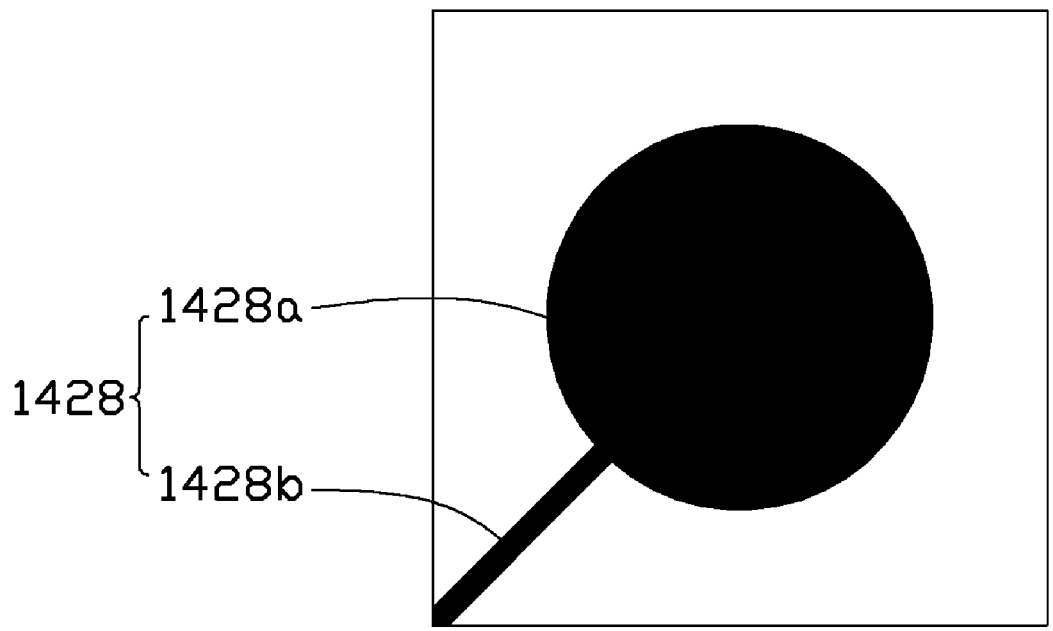
FIG. 5 shows a structure of a second electrode layer of the LC lens group in FIG. 3.

Referring to FIGS. 4 to 5, each the first and second electrode layers 1426 and 1428 is a light-pervious, electrically conductive material, such as tin-doped indium oxide (ITO). The first electrode layer 1426 includes a plurality of concentric ring-shaped electrodes 1426a and a first connection terminal 1426b. The widths of the electrodes 1426a and spaces between adjacent electrodes 1426a are arranged according to concentric annuluses of a Fresnel zone plate. The first connection terminal 1426b is electrically connected to all of the electrodes 1426a. One distal end of the first connection terminal 1426b extends to a corner of the first light-pervious plate 1422, and is exposed to outside from one of the side wall surfaces 150 of the LC lens group 14. The second electrode layer 1428 includes a common electrode 1428a and a second connection terminal 1428b. The common electrode 1428a is rounded, and is aligned with the electrodes 1426a. A diameter of the common electrode 1428a is substantially equal to or a little greater than an outer diameter of the outermost one of the electrodes 1426a. The second connection terminal 1428b is electrically connected to the common electrode 1428a. One distal end of the second connection terminal 1428b extends to a corner of the second light-pervious plate 1424, and is exposed to outside from one of the side wall surfaces 150 of the LC lens group 14. The distal ends of the first connection terminal 1426b and the second connection terminal 1428b are at two opposite corners of the LC lens 142.

When a voltage is applied to the first electrode layer 1426 and the second electrode layer 1428, the LC molecules of the LC layer 1434 between the each electrode 1426a and the common electrode 1428a deflect to another orientation. The electrodes 1426a have a shape similar to a Fresnel zone plate. Therefore, the LC lens 142 functions as a Fresnel lens, which is configured for focusing light. The electrodes 1426a and the common electrode 1428a are both named a patterned electrode.

The LC lens 144 has a similar structure to the LC lens 142. The LC lens 144 includes a third electrode layer 1446 corresponding to the first electrode layer 1426, and a fourth electrode layer 1448 corresponding to the second electrode layer 1428. The third electrode layer 1446 includes a third connection terminal (not shown) corresponding to the first connection terminal 1426b. The fourth electrode layer 1448 includes a fourth connection terminal (not shown) corresponding to the second connection terminal 1426b. One distal end of the third and fourth connection terminals are at opposite corners of the LC lens group 14, respectively, which are different from the two corners that the first and second connection terminals 1426b and 1428b are located. That is, the distal ends of the first to fourth connection terminals of the LC lens group 14 are located at four corners of the LC lens group 14, respectively, and are exposed to outside from the side wall surfaces 150 of the LC lens group 14.

The lens barrel 12 includes a base 122 and a lens receiving member 124 connected to the base 122. The lens barrel 12 is a thermal plastic material containing at least a metal-organic compound. The thermal plastic material can be polypropylene. The metal-organic compound can be a $Pd^{2+}$-based or $Cu^{2+}$-based compound, and the $Cu^{2+}$ is preferable. The base 122 is substantially cubiform. The lens receiving member 124 is substantially cylindrical. The base 122 and the lens receiving member 124 are integrally connected to each other, thereby forming a monolithic body. Also, the base 122 and the lens receiving member 124 have a common central axis O1. The base 122 has a first end 122a abaxial to the lens receiving member 124. The lens receiving member 124 has a second end 124a abaxial to the first end 122a.

The base 122 defines a first receiving hole 1222 in the first end 122a. The first receiving hole 1222 is cuboid, and can also be cylindrical. The first receiving hole 1222 is configured for receiving the image sensor 30 and an infrared-cut filter (not shown). The base 122 has four outer side wall surfaces 122b adjacent to the first end 122a. The base has two contact blocks 122c protruding from each of two opposite outer side wall surfaces 122b. Each of the contact blocks 122c has a contact surface 122d coplanar with the first end 122a. The contact surface 122d is configured for contacting the printed circuit board 20.

The lens receiving member 124 defines a stepped hole 126. The stepped through hole 126 includes a second receiving hole portion 126a through the second end 124a, and an interconnection hole portion 126b interconnecting the second receiving hole portion 126a and the first receiving hole 1222. In this embodiment, the second receiving hole portion 126a and the interconnecting hole 126b are cylindrical, and are coaxial with each other. The diameter of the second receiving hole portion 126a is greater than that of the interconnection hole portion 126b such that an annular support surface 126c is formed at an interface between the second receiving hole portion 126a and the interconnection hole portion 126b. The support surface 126c is configured for contacting the light output surface 148 of the LC lens group 14. The lens receiving member 124 defines an inner surface 1262 in the second receiving hole portion 126a. The lens receiving member 124 includes a number of positioning blocks 126d protruding from the inner surface 1262. The positioning blocks 126d are configured for resisting four side wall surfaces 150 of the LC lens group 14, thereby positioning the LC lens group 14 in the lens receiving member 124. The second receiving hole portion 126a has a depth along a central axial thereof. The depth of the second receiving hole portion 126a is greater than the thickness of the LC lens group 14 such that the LC lens group 14 is entirely received in the second receiving hole portion 126a.

The image pick-up device 100 further includes four electrically conductive traces 16 embedded in outer surfaces of the lens barrel 12. In this embodiment, the electrically conductive trace 16 is multi-layer film including a copper layer, a nickel layer and a gold layer. The four electrically conductive traces 16 extend from the support surface 126c. Then all four electrically conductive traces 16 pass through the inner surface 1262, the second end 124a, an outer side wall surface of the lens receiving member 124, one of the outer side wall surfaces 122b, and an outer surface of the contact block 122c, and finally stop at the contact surface 122d of the contact block 122c. The four electrically conductive traces 16 correspond respectively to the four contact blocks 122c. One end of each electrically conductive trace 16 in the second receiving hole portion 126a is adjacent to one corner of the LC lens group 14. The four connection terminals 1426b, 1428b, are electrically connected respectively to the four electrically conductive traces 16 that are exposed from the side wall surfaces 150 of the LC lens group 14. Electrically conductive glue (not shown), fills in spaces between the electrically conductive traces 16 and corresponding corners of the LC lens group 14.

A method used to embed the electrically conductive traces 16 in the outer surfaces of the lens barrel 12 is described in detail as follows:

First, surface regions of the lens barrel 12, where the electrically conductive traces 16 are required to be embedded in are irradiated by laser light. The laser light activates the surface regions of the lens barrel 12, in such a way that active metal particles are decomposed from the metal-organic compound contained in the thermal plastic material. Also, laser irradiation leads to an ablation on the plastic surface. Only part of the polymer material of the lens barrel 12 is ablated, this causes the irradiated surface regions of the lens barrel 12 to be rough.

Second, the irradiated surface regions of the lens barrel 12 are metalized. That is, the irradiated surface regions are deposited with metal layers. The metallization method includes chemical metallization a copper layer and nickel layer sequentially, and then strike plating a gold layer. The active metal particles on the surface of the lens barrel 12 can be a reducing agent in chemical metallization the copper layer. In addition, the rough surfaces enhance adhesion to the metal layers.

The electrically conductive traces 16 can also be other multi-layer films, such as a multi-layer film comprising a palladium layer and a gold layer. Also, the electrically conductive traces 16 each can also be single-layer films, for example an tin film, an silver film, a copper film, or an organic solderable preservative (OSP).

The printed circuit board 20 is configured for electrically interconnecting various electric components in the image pick-up device 100. Four metallic contact pads 202 are fixed on a surface of the printed circuit board 20. The contact pads 202 are electrically connected to circuits (not shown) in the print circuit board 20. Positions of the contact pads 202 correspond respectively to the four contact blocks 122c such that the four contact surfaces 122d respectively contact the four contact pads 202. The four electrically conductive traces 16 embedded in the contact surfaces 122d are electrically connected respectively to the four contact pads 202. Therefore, the electrode layers 1426, 1428, 1446, and 1448 are electrically connected to the printed circuit board 20.

The image sensor 30 is configured for detecting and processing light entrance in the lens module 10. The image sensor 30 is mounted on the printed circuit board 20, and is electrically connected to the printed circuit board 20. The base 122 is arranged around the image sensor 30 for securing the image sensor 30. Furthermore, the LC lens group 14 of the lens module 10 is optically aligned with the image sensor 30.

The LC lens group 14 can also be a single LC lens, or include more than two LC lenses. Accordingly, the number of the electrode layers and the number of the electrically conductive traces 16 may be decreased or increased. For example, when the LC lens group 14 includes more than two LC lenses, the number of the electrode layers would be more than four. In that case, all the LC lenses of the LC lens group 14 can be made in a polygon shape having more than four sides, such as a hexagon. In addition, distal ends of the connection terminals of the LC lens group can also be exposed on the side wall surfaces of the LC lens group and spaced apart from the corners. In that case, more than one distal end of the connection terminals can be exposed at a single side wall surface of the LC lens group as long as the ends are spaced apart from each other. Furthermore, the LC lens group 14 can be rounded as long as the connection terminals exposed on the side wall surface of the LC lens group are spaced apart from each other.

The four electrically conductive traces 16 can extend respectively from four outer side wall surfaces 122b of the base 122 or on a same side wall surface 122b of the base 122. Also, one end of each of the electrically conductive traces 16 can be stopped at the inner surface 1262 of the lens receiving member 124. It is not necessary for the electrically conductive traces 16 to extend to the support surface 126c. Furthermore, the contact blocks 122c can be omitted. In that case, the electrically conductive traces 16 extend to the first end 122a.

In this embodiment, the electrically conductive traces 16 interconnect the LC lens group 14 and the printed circuit board 20 instead of the flexible circuit board. The electrically conductive traces 16 are embedded in the outer surface of the lens barrel 12, thereby the space that the flexible circuit board occupies is saved. Therefore, the lens module 10 can be made in a smaller size. In addition, the shape of the lens barrel 12 is not limited by the electrically conductive traces 16.

Figure 6:
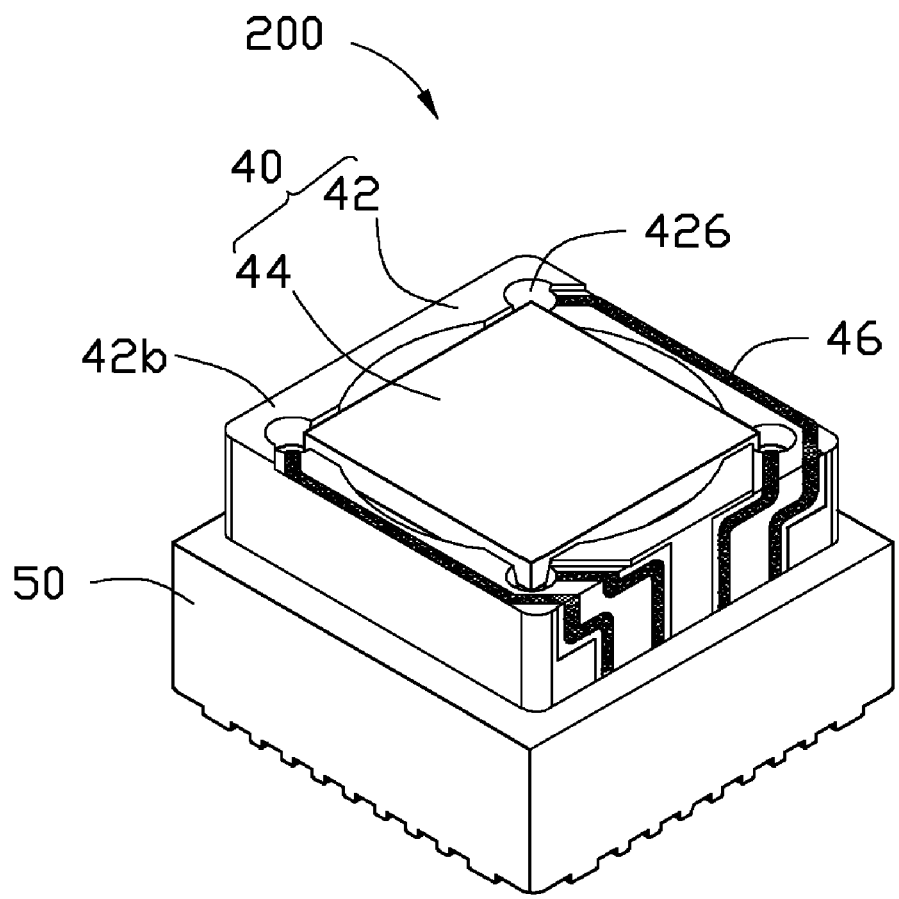
FIG. 6 is a schematic, assembled view of an image pick-up device in accordance with a second exemplary embodiment.
Figure 7:
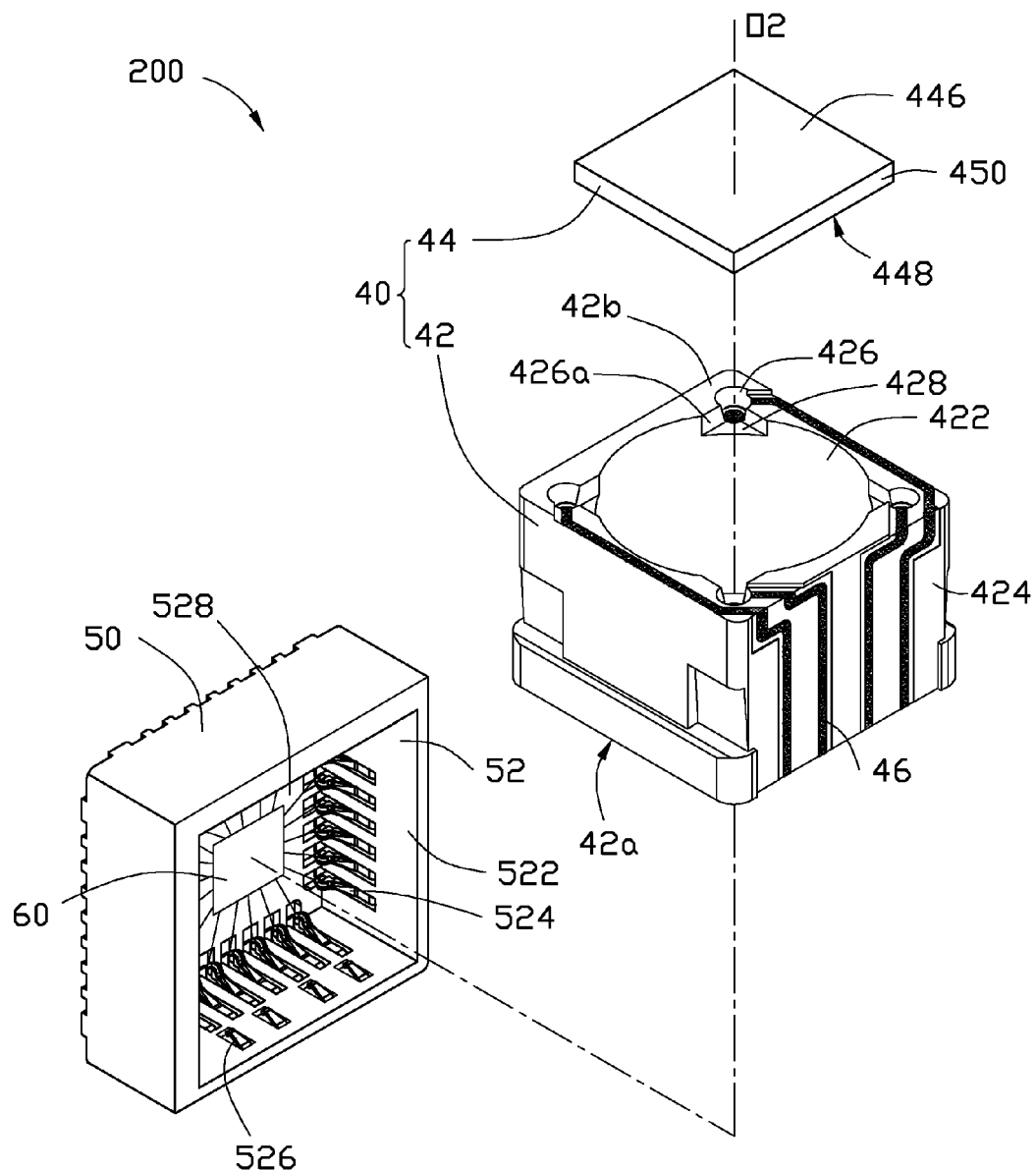
FIG. 7 is a schematic, disassembled view of the image pick-up device in FIG. 6.

Referring to FIGS. 5 and 6, an image pick-up device 200 in accordance with a second embodiment includes a lens module 40, a connection socket 50, and an image sensor 60. The lens module 40 includes a lens barrel 42 and an LC lens group 44. The LC lens group 44 is identical to the lens group 14 of the first embodiment. The LC lens group 44 has a light incident surface 446, a light output surface 148 abaxial to the light incident surface 446, and four side wall surfaces 450 interconnecting the light incident surface 446 and the light output surface 448.

A material of the lens barrel 42 is identical to the lens barrel 12 of the first embodiment. The lens barrel 42 is generally cuboid, and includes a first end 42a, a second end 42b abaxial to the first end 42a, and four outer side wall surfaces 424 interconnecting the first end 42a and the second end 42b. The lens barrel 42 defines a through hole 422 through the first end 42a and the second end 42b. The through hole 422 has a central axis O2, and is coaxial with the lens barrel 42.

The lens barrel further defines four receiving recesses 426 in the second end 42b. The receiving recesses 426 extend substantially parallel with a central axis O2 of the through hole 422, and are open to the through hole 422. The four receiving recesses 426 are spaced equal angles apart around the central axis O2, and have a depth greater than the thickness of the LC lens group 44. The four receiving recesses 426 are configured for respectively receiving four corner portions of the LC lens group 44. The lens barrel 42 has two abutting surfaces 426a partly defining each of the receiving recesses 426. The two abutting surfaces 426a are substantially parallel with the central axis O2, and are substantially perpendicular to each other. The four corner portions of the LC lens group 44 are received respectively in the four receiving recesses 426. The light output surface 448 of the LC lens group 44 contacts a bottom surface 428 of each receiving recess 426. The two abutting surfaces 426a of each of the receiving recesses 426 resist two adjacent side wall surfaces of the corresponding corner portion of the LC lens group 44, thereby positioning the LC lens group 44 in the lens barrel 42.

The image pick-up device 200 further includes four electrically conductive traces 46 embedded in outer surfaces of the lens barrel 42. A method that is used to embed the electrically conductive traces 46 in the outer surfaces of the lens barrel 42 is similar to that of the first exemplary embodiment. The four electrically conductive traces 46 extend from the bottom surface of the receiving recess 426. Then the four electrically conductive traces 46 pass by the side wall surface of the corresponding receiving recess 426, the second end 42b, an outer side wall surface 424 of the lens barrel 42, and finally stop at the boundary line between the outer side wall surface 424 and the first end 42a. In this embodiment, the four electrically conductive traces 46 extend on the same outer side wall surface 424 of the lens barrel 42. The electrically conductive traces 46 are located on the outer side wall surface 424 substantially parallel with the central axis O2.

The connection socket 50 has a cuboid connection recess 52. Four inner side wall surfaces 522 and an inner bottom surface 528 of the connection socket 50 cooperatively define the connection recess 52. The connection socket 50 includes a plurality of first contact pins 524 fixed on the four inner side wall surfaces 522, and four second contact pins 526 fixed on one of the inner side wall surfaces 522. The second contact pins 526 are closer to an opening of the connection recess 52 than the first connection pins 524. The first and second connection pins 524 and 526 are electrically connected to the respective electric components of the image pick-up device 200. The second connection pins 526 are resilient and tilt relative to the corresponding inner side wall surface 522 along a direction abaxial to the opening of the connection recess 52. The four second connection pins 526 are spaced apart from each other. The distance between adjacent connection pins 526 correspond to distance between adjacent electrically conductive traces 46 such that the four electrically conductive traces 46 can be electrically connected respectively to the four second connection pins 526

The image sensor 60 is arranged on the inner bottom surface 528, and is electrically connected to the first connection pins 526. The lens barrel 42 is partly received in the connection recess 52 in such a way that the first end 42a is received in the connection recess 52. The four second connection pins 526 are respectively in elastic contact with the four electrically conductive traces 46, thereby electrically connecting to the electrically conductive traces 46. The LC lens group 44 is optically coupled with the image sensor 60.

The image sensors 16 and 46 can also be encapsulated in other forms, not limited to the first and second embodiments.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A lens module, comprising:
    a liquid crystal lens, the liquid crystal lens comprising a light incident surface, a light output surface facing away from the light incident surface, and a plurality of side wall surfaces interconnecting the light incident surface and the light output surface, the liquid crystal lens comprising at least two electrode layers, each of the electrode layers comprising a connection terminal exposed at the corresponding side wall surface;
    a lens barrel comprising a base and a lens receiving member connected to the base, the base being substantially cubiform, the lens receiving member being substantially cylindrical, the base and the lens receiving member being integrally connected to each other, thereby forming a monolithic body, the base and the lens receiving member having a common central axis, the base having a first end abaxial to the lens receiving member, the base defining a first receiving hole in the first end, the first receiving hole being configured for receiving an image sensor, the base having two contact blocks protruding from each of two opposite outer side wall surfaces thereof, each of the contact blocks having a contact surface coplanar with the first end, the contact surface being configured for contacting a printed circuit board, the lens receiving member having a second end abaxial to the first end, the lens receiving member defining a stepped hole, the stepped through hole including a second receiving hole portion through the second end, and an interconnection hole portion interconnecting the second receiving hole portion and the first receiving hole, a support surface being formed between the second receiving hole portion and the interconnection hole, the liquid crystal lens received in the second receiving hole portion, and the light output surface of the liquid crystal lens contacting the support surface; and two electrically conductive traces embedded in an outer surface of the lens barrel, the electrically conductive traces each comprising a first end exposed in the second receiving hole portion and electrically connected to the corresponding connection terminal, and a second end exposed at the contact surface of the corresponding contact block for electrical connection to an external circuit.

2. The lens module of claim 1, wherein the lens barrel further comprises a plurality of positioning blocks protruding from an inner surface of the lens lens receiving member in the second receiving hole portion, the positioning blocks resisting the side wall surfaces of the liquid crystal lens, thereby positioning the liquid crystal lens in the second receiving hole portion.

3. The lens module of claim 2, wherein the liquid crystal lens is substantially rectangular, the connection terminals being respectively exposed at opposite corners of the liquid crystal lens.

4. The lens module of claim 2, wherein the lens barrel has a central axis, the stepped through hole being coaxial with the central axis of the lens barrel, the second receiving hole portion having a depth along the central axis greater than the thickness of the liquid crystal lens.

5. The lens module of claim 3, wherein the liquid crystal lens includes two stacked liquid crystal lens units, the at least two electrode layers comprising four electrode layers with four connection terminals exposed at four corners of the liquid crystal lens.

6. The lens module of claim 1, wherein the liquid crystal lens is substantially rectangular, the lens barrel defining four spaced receiving recesses in the second end, the four receiving recesses being open to the second receiving hole portion, four corners of the liquid crystal lens being respectively positioned in the four receiving recesses, the connection terminals being respectively exposed at opposite corners of the liquid crystal lens, the first ends of the electrically conductive traces being respectively arranged in two of the receiving recesses spatially corresponding to the two connection terminals.

7. The lens module of claim 6, wherein the lens barrel has two abutting surfaces in each of the receiving recesses, each two abutting surfaces substantially perpendicular to each other and parallel with the central axis of the lens barrel resisting two adjacent side wall surfaces of the corresponding corner of the at least one liquid crystal lens, thereby positioning the liquid crystal lens in the lens barrel.

8. The lens module of claim 7, wherein the electrically conductive traces are substantially parallel to the central axis of the through hole.

9. The lens module of claim 1, wherein the lens barrel is comprised of a thermal plastic material containing at least a metal-organic compound.

10. The lens module of claim 9, wherein the thermal plastic material is polypropylene.

11. The lens module of claim 9, wherein the metal-organic compound is a $Pd^{2+}$-based compound or a $Cu^{2+}$-based compound.

12. The lens module of claim 1, wherein the first receiving hole is cuboid.

13. An image pick-up device, comprising:
a lens module as claimed in claim 1;
a printed circuit board, two contact pads fixed on and electrically connected to the printed circuit board, the second ends of electrically conductive traces exposed at the contact surfaces of the contact blocks contacting the respective contact pads; and
an image sensor electrically mounted on the printed circuit board, the image sensor being optically aligned with the liquid crystal lens and received in the first receiving hole.

14. An image pick-up device, comprising:
a lens module comprising:
a liquid crystal lens, the liquid crystal lens comprising a light incident surface, a light output surface facing away from the light incident surface, and a plurality of side wall surfaces interconnecting the light incident surface and the light output surface, the liquid crystal lens comprising at least two electrode layers, each of the electrode layers comprising a connection terminal exposed at the corresponding side wall surface,
a lens barrel being generally cuboid, the liquid crystal lens received in the lens barrel, and
two electrically conductive traces embedded in an outer surface of the lens barrel, the electrically conductive traces each comprising a first end electrically connected to the corresponding connection terminal, and a second end for electrical connection to an external circuit;
a connection socket defining a cuboid connecting recess, four inner side wall surfaces and an inner bottom surface of the connection socket cooperatively define the connection recess, the connection socket having an opening opposite to the bottom surface, the connection socket comprising a plurality of first connection pins fixed on the four inner side wall surfaces, and two second connection pins on one of the inner side wall surfaces, the second connection pins being resilient and tilt relative to the corresponding inner side wall surface along a direction abaxial to the opening of the connection recess, the lens barrel being partly received in the connection socket, the electrically conductive traces respectively being in elastic contact with the second connection pins, thereby electrically connected to the electrically conductive traces; and
an image sensor received in the connection socket and on the inner bottom surface, and electrically connected to the first connection pins.

15. The image pick-up device of claim 14, wherein the second contact pins are closer to an opening of the connection recess than the first connection pins.

* * * * *